US009102995B2

(12) United States Patent
Bode et al.

(10) Patent No.: US 9,102,995 B2
(45) Date of Patent: *Aug. 11, 2015

(54) CROSS-LINKED ETHYLSULFONATED DIHYDROXYPROPYL CELLULOSE

(71) Applicant: Nalco Company, Naperville, IL (US)

(72) Inventors: Heinrich E. Bode, Aurora, IL (US); John D. Kildea, Baldivis (AU); Jing Wang, Aurora, IL (US)

(73) Assignee: NALCO COMPANY, Naperville, IL (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/798,761

(22) Filed: Mar. 13, 2013

(65) Prior Publication Data

US 2013/0195739 A1 Aug. 1, 2013

Related U.S. Application Data

(63) Continuation-in-part of application No. 13/729,744, filed on Dec. 28, 2012, and a continuation-in-part of application No. 12/852,910, filed on Aug. 9, 2010, now Pat. No. 8,298,508.

(51) Int. Cl.
| | |
|---|---|
| C01F 7/02 | (2006.01) |
| C22B 21/00 | (2006.01) |
| C01F 7/06 | (2006.01) |
| C01F 7/14 | (2006.01) |
| C01F 7/47 | (2006.01) |

(52) U.S. Cl.
CPC ............ *C22B 21/0015* (2013.01); *C01F 7/0653* (2013.01); *C01F 7/145* (2013.01); *C01F 7/148* (2013.01); *C01F 7/473* (2013.01)

(58) Field of Classification Search
CPC .......... C01F 7/145; C01F 7/148; C01F 7/472; C01F 7/0653; C22B 21/0015
USPC .......... 210/729–732; 423/625, 630, 111, 121, 423/122, 127
See application file for complete search history.

(56) References Cited

U.S. PATENT DOCUMENTS

| | | | |
|---|---|---|---|
| 3,085,853 A | 4/1963 | Lesinski | |
| 4,339,331 A | 7/1982 | Lim | |
| 4,737,352 A | 4/1988 | Owen | |
| 4,990,609 A | 2/1991 | Herzog et al. | |
| 5,008,089 A | 4/1991 | Moody | |
| 5,041,269 A | 8/1991 | Moody | |
| 5,049,612 A | 9/1991 | Bulstovic | |
| 5,091,159 A | 2/1992 | Connelly | |
| 5,106,599 A | 4/1992 | Roe | |
| 5,217,620 A | 6/1993 | Mahoney et al. |
| 5,346,628 A | 9/1994 | Sommese |
| 5,478,477 A | 12/1995 | Ramesh et al. |
| 5,534,235 A | 7/1996 | Reed et al. |
| 5,716,530 A | 2/1998 | Strominger et al. |
| 5,853,677 A | 12/1998 | Avotins et al. |
| 6,605,674 B1 | 8/2003 | Whipple et al. |
| 6,726,845 B1 | 4/2004 | Barham et al. |
| 6,740,249 B1 | 5/2004 | Barham |
| 6,814,873 B2 | 11/2004 | Spitzer |
| 2006/0276597 A1 | 12/2006 | Quadir et al. |
| 2007/0172405 A1 | 7/2007 | Liu |
| 2008/0107578 A1 | 5/2008 | Wang et al. |
| 2008/0257827 A1 | 10/2008 | Dai et al. |
| 2012/0034142 A1 | 2/2012 | Wang et al. |
| 2012/0034143 A1 | 2/2012 | Chester et al. |

FOREIGN PATENT DOCUMENTS

| | | |
|---|---|---|
| AU | 5310690 A | 10/1990 |
| AU | 737191 B2 | 8/2001 |
| WO | WO 97-41064 A1 | 11/1997 |
| WO | WO97-41064 A1 | 11/1997 |
| WO | WO9929626 A1 | 6/1999 |
| WO | WO2009085514 A2 | 7/2009 |
| WO | WO2012031316 A1 | 3/2012 |

OTHER PUBLICATIONS

Step change improvements in underflow rheology by Berger A. et al., Proceedings of the 14th International Seminar on Paste and Thickened Tailings, pp. 135-141 (2011).
Effect of Surfactants on Bauxite Residues Suspensions Viscosity by Frost, R, et al, Colloids and Surfaces A: Physicochemical and Engineering Aspects, 292(1), pp. 21-26 (2007).
Kapusniak, Janusz et al., "Starch Based Depressors for Selective Flotation of Metal Sulfide Ores," Starch, vol. 51, No. 11-12, 2000, pp. 416-421.
Termes, S.C. et al., "Insoluble crosslinked starch xanthate as a selective flocculant for sulfide minerals," Transactions of the American Institute of Mining, Metallurgical, and Petroleum Engineers, Society of Mining Engineers of AIME, vol. 274, 1983, pp. 1971-1977.
International Search Report mailed Jun. 9, 2014 for related PCT application PCT/US2014/015538. (10 Pages).

*Primary Examiner* — Richard M Rump
(74) *Attorney, Agent, or Firm* — Benjamin Carlsen

(57) ABSTRACT

The invention provides methods and compositions for improving the production of alumina hydrate. The invention involves adding one or more cross-linked ethylsulfonated polysaccharides to liquor or slurry in the fluid circuit of the production process. The one or more polysaccharides include cross-linked dextran or cross-linked dihydroxypropyl cellulose. The various polysaccharides can impart a number of advantages including at least some of: greater flocculation effectiveness, increasing the maximum effective dosage, faster settling rate. The production process can be a Bayer process.

12 Claims, No Drawings

CROSS-LINKED ETHYLSULFONATED DIHYDROXYPROPYL CELLULOSE

CROSS-REFERENCE TO RELATED APPLICATIONS

This application is a continuation in part of co-pending U.S. patent application Ser. No. 13/729,744 filed on Dec. 28, 2012 which in turn is a continuation in part of U.S. patent application Ser. No. 12/852,910 filed on Aug. 9, 2010 and which has issued as U.S. Pat. No. 8,298,508.

STATEMENT REGARDING FEDERALLY SPONSORED RESEARCH OR DEVELOPMENT

Not Applicable.

BACKGROUND OF THE INVENTION

In the typical Bayer process for the production of alumina trihydrate, bauxite ore is pulverized, slurried with caustic solution, and then digested at elevated temperatures and pressures. The caustic solution dissolves oxides of aluminum, forming an aqueous sodium aluminate solution. The caustic-insoluble constituents of bauxite ore are then separated from the aqueous phase containing the dissolved sodium aluminate. Solid alumina trihydrate product is precipitated out of the solution and collected as product.

As described at least in part, among other places, in U.S. Pat. No. 6,814,873, the Bayer process is constantly evolving and the specific techniques employed in industry for the various steps of the process not only vary from plant to plant, but also are often held as trade secrets. As a more detailed, but not comprehensive, example of a Bayer process, the pulverized bauxite ore may be fed to a slurry mixer where an aqueous slurry is prepared. The slurry makeup solution is typically spent liquor (described below) and added caustic solution. This bauxite ore slurry is then passed through a digester or a series of digesters where the available alumina is released from the ore as caustic-soluble sodium aluminate. The digested slurry is then cooled, for instance to about 220 degrees F., employing a series of flash tanks wherein heat and condensate are recovered. The aluminate liquor leaving the flashing operation contains insoluble solids, which solids consist of the insoluble residue that remains after, or are precipitated during, digestion. The coarser solid particles may be removed from the aluminate liquor with a "sand trap", cyclone or other means. The finer solid particles may be separated from the liquor first by settling and then by filtration, if necessary.

The clarified sodium aluminate liquor is then further cooled and seeded with alumina trihydrate crystals to induce precipitation of alumina in the form of alumina trihydrate, $Al(OH)_3$. The alumina trihydrate particles or crystals are then classified into various size fractions and separated from the caustic liquor. The remaining liquid phase, the spent liquor, is returned to the initial digestion step and employed as a digestant after reconstitution with caustic.

Within the overall process one of the key steps is that of precipitation of the alumina trihydrate from the clarified sodium aluminate liquor. After the insoluble solids are removed to give the clarified sodium aluminate liquor, also referred to as "green liquor", it is generally charged to a suitable precipitation tank, or series of precipitation tanks, and seeded with recirculated fine alumina trihydrate crystals. In the precipitation tank(s) it is cooled under agitation to induce the precipitation of alumina from solution as alumina trihydrate. The fine particle alumina trihydrate acts as seed crystals which provide nucleation sites and agglomerate together and grow as part of this precipitation process.

Alumina trihydrate crystal formation (the nucleation, agglomeration and growth of alumina trihydrate crystals), and the precipitation and collection thereof, are critical steps in the economic recovery of aluminum values by the Bayer process. Bayer process operators strive to optimize their crystal formation and precipitation methods so as to produce the greatest possible product yield from the Bayer process while producing crystals of a given particle size distribution. A relatively large particle size is beneficial to subsequent processing steps required to recover aluminum metal. Undersized alumina trihydrate crystals, or fines, generally are not used in the production of aluminum metal, but instead are recycled for use as fine particle alumina trihydrate crystal seed. As a consequence, the particle size of the precipitated trihydrate crystals determines whether the material is to be ultimately utilized as product (larger crystals) of as seed (smaller crystals). The classification and capture of the different sized trihydrate particles is therefore an important step in the Bayer process.

This separation or recovery of alumina trihydrate crystals as product in the Bayer process, or for use as precipitation seed, is generally achieved by settling, cyclones, filtration and/or a combination of these techniques. Coarse particles settle easily, but fine particles settle slowly. Typically, plants will use two or three steps of settling in order to classify the trihydrate particles into different size distributions corresponding to product and seed. In particular, in the final step of classification a settling vessel is often used to capture and settle the fine seed particles. Within the settling steps of the classification system, flocculants can be used to enhance particle capture and settling rate.

The overflow of the last classification stage is returned to the process as spent liquor. This spent liquor will go through heat exchangers and evaporation and eventually be used back in digestion. As a result, any trihydrate particles reporting to the overflow in this final settling stage will not be utilized within the process for either seed or product. Effectively such material is recirculated within the process, creating inefficiencies. Therefore, it is important to achieve the lowest possible concentration of solids in the overflow of the last stage of classification to maximize the efficiency of the process.

As described for example in U.S. Pat. No. 5,041,269, conventional technology employs the addition of synthetic water soluble polyacrylate flocculants and/or dextran flocculants to improve the settling characteristics of the alumina trihydrate particles in the classification process and reduce the amount of solids in the spent liquor. While various flocculants are often used in the trihydrate classification systems of Bayer plants, it is highly desirable to reduce as far as possible, the loss of solids with the spent liquor.

Thus there is clear need and utility for a method of improving the classification and flocculation of precipitated alumina trihydrate in the Bayer process. Such improvements would enhance the efficiency of the production of alumina from bauxite ore.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists. Additional features and advantages are described herein, and will be apparent from, the following Detailed Description.

BRIEF SUMMARY OF THE INVENTION

The invention relates to a method for improving the Bayer process for the production of alumina from bauxite ore. The invention concerns the use of cross-linked polysaccharides, specifically cross-linked dextran or cross-linked dihydroxypropyl cellulose to improve the performance of unit operations within the Bayer process, in particular to enhance the settling of fine alumina trihydrate crystals. The cross linked cellulose comprises covalently cross-linked mixed cellulose ether containing predominantly 2,3-dihydroxypropyl ethers. It may also comprise ethylsulfonate ethers. Key characteristic of such cross-linked cellulose ether are the presence of 2,3-dihydroxypropyl groups and the covalent cross-linking achieved under homogenous reaction conditions resulting in significant viscosity increases of the in water dissolved polymer. A surprisingly unique characteristic of the so prepared dihydroxypropyl ethers is their capability to enhance the flocculation of aluminum trihydrate solids from a highly alkaline, pregnant process liquors in the Bayer process.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Consisting Essentially of" means that the methods and compositions may include additional steps, components, ingredients or the like, but only if the additional steps, components and/or ingredients do not materially alter the basic and novel characteristics of the claimed methods and compositions.

"Dextran" is a polysaccharide characterized as being an α-D-1,6 glucose-linked glucan with side chains 1-3 linked to the backbone units of the polysaccharide.

"Dihydroxypropyl cellulose" means a cellulose derivative with the addition of 1,2-dihydroxypropyl ether group to the cellulose backbone.

"Hydrocyclone" means a device to classify, separate or sort particles in a liquid suspension based on the ratio of their centripetal force to fluid resistance, in particular for dense and coarse particles, and low for light and fine particles, they often have a cylindrical section at the top where liquid is being fed tangentially and a conical base, and they often have two exits on the axis: the smaller on the bottom (for underflow) and a larger one at the top (for overflow), generally the underflow is the denser or coarser fraction, while the overflow is the lighter or finer fraction.

"Liquor" or "Bayer liquor" means a caustic, liquid medium that has run through a Bayer process in an industrial facility.

"Polysaccharide" means a polymeric carbohydrate having a plurality of repeating units comprised of simple sugars, the C—O—C linkage formed between two such joined simple sugar units in a polysaccharide chain is called a glycosidic linkage, and continued condensation of monosaccharide units will result in polysaccharides, common polysaccharides are amylase and cellulose, both made up of glucose monomers, polysaccharides can have a straight chain or branched polymer backbone including one or more sugar monomers, common sugar monomers in polysaccharides include glucose, galactose, arabinose, mannose, fructose, rahmnose, and xylose.

"Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards a process for extracting alumina trihydrate comprises the digestion of pretreated bauxite ore in an alkaline liquor to produce a slurry of red mud solids and aluminate in suspension in the alkaline liquor then decanting the red mud solids from the alkaline liquor suspension to produce the decanting liquor; the passing of said decanting liquor through security filtration to remove all solids, precipitation and production of a slurry containing alumina trihydrate solids which then are flocculated and settled with the addition of a cross-linked polysaccharide. Larger trihydrate particles are put through the calcination process to produce purified alumina while finer particles are re-used as seed for the precipitation process.

In at least one embodiment the preferred flocculant of the trihydrate solids in the process is a crosslinked polysaccharide. Preferred polysaccharides include dextran and dihydroxypropyl cellulose. The flocculant is added in the range of 0.1 to 100 ppm. The most preferred dose range for the flocculant is 0.3 to 20 ppm. The cross linked cellulose can comprise covalently cross-linked mixed cellulose ether containing 2,3-dihydroxypropyl ethers. In at least one embodiment the cross linked cellulose is predominantly 2,3-dihydroxypropyl ethers. In at least one embodiment the cross linked polysaccharide/cellulose also comprises ethylsulfonate ethers. Key characteristic of such cross-linked cellulose ether are the presence of 2,3-dihydroxypropyl groups.

In at least one embodiment the reagent used to convert cellulose to dihydroxypropyl cellulose is glycidol. Another suitable reagents is 3-chloro-1,2-propanediol.

In at least one embodiment the dihydroxypropyl cellulose is further modified to contain additional anionic charge. This may be accomplished by reacting the dihydroxypropyl cellulose with sodium vinylsulfonate and/or sodium chloroacetate.

In at least one embodiment the cross-linkages in the ethylsulfonated dihydroxypropyl cellulose are formed at least in part by reaction with a reagent such as epichlorohydrin, divinylsulfone, glycerol diglycidyl ether, polyethyleneglycol diglycidyl ether, neopentylglycol diglycidyl ether, resorcinol diglycidyl ether, 1,2-dichloroethane, N,N-methylene bisacrylamide, and 1,4-benzoquinone, and any combination thereof. The cross-linking agents produce bonds between the individual polymer chains of ethylsulfonated dihydroxypropyl cellulose that are stable in aqueous alkaline media. Ether linkages as produced by epichlorohydrin or diglyccidyl ethers belong to these group of bonds.

In at least one embodiment the cross-linked polysaccharide is dextran. In at least one embodiment the cross-linked dihydroxypropyl cellulose is produced by addition of dextran or dihydroxypropyl cellulose to an alkaline solution containing sodium hydroxide, potassium hydroxide, or other alkali metals or water soluble alkaline earth metal hydroxide, to provide a causticized polymer solution having a pH in the range of 11 to 14. The causticized polysaccharide is then reacted with an appropriate bifunctional cross-linking agent.

As described at least in U.S. Pat. Nos. 6,726,845, 6,740,249, 3,085,853, 5,008,089, 5,041,269, 5,091,159, 5,106,599, 5,346,628 and 5,716,530 and Australian Patents 5310690 and 737191, dextran itself has previously been used in the Bayer Process.

However, by cross-linking the dextran or dihydroxypropyl cellulose chains (or for that matter, other suitable polysaccharides), superior and unexpected improvements are observed in the activity of cross-linked material when compared to conventional polysaccharides or the uncross-linked analog. Prior art uses of polysaccharides are impaired by the fact that increasing dosages of polysaccharides in Bayer liquor result in superior flocculation only up to a maximum dosage. After the maximum dosage has been reached, further addition of such polysaccharide material typically produces no further performance improvement. When the cross-linked polysaccharides are used and in particular when cross-linked dextran is used, superior performance (not possible at any dose rate using conventional polysaccharides) can be achieved. Surprisingly the maximum performance of cross-linked dextran is superior to the maximum performance using conventional dextran at any dose. Additionally, for cross-linked polysaccharides, the dose at which continued addition results in no further performance benefits is increased. Furthermore, when the polysaccharide is cross-linked an unexpected 50% increase in effectiveness has been observed. For example, a composition comprising 5% cross-linked dextran will perform at least as well as a 10% composition of dextran, and in some cases better.

U.S. Pat. Nos. 5,049,612 and 4,339,331 teach that in mining applications such as sulfide ore flotation, it was found that the performance of starch, a traditional flotation depressant, can be improved after cross-linking. So while it is true that cross-linked polysaccharides have been used in mining applications such as in U.S. Pat. Nos. 5,049,612 and 4,339,331, it is quite unexpected that in Bayer process applications, the activity of dextran would be significantly improved after cross-linking. Furthermore, the ability of cross-linked polysaccharides to have up to or at least a 50% improvement in performance or to increase the maximum effective dosage of polysaccharides is unexpected and novel. In at least one embodiment the mass ratio of a general cross linking reagent/polysaccharide can be varied between, but is not limited to, about 0 to 0.2. Specifically, for epichlorohydrin as the cross linking reagent, the ratio can be varied between, but is not limited to, 0 to 0.1, most preferably 0.005 to 0.08. Appropriate cross-linking is achieved as measured by an increase in the solution viscosity of at least 10% above the original solution viscosity.

In at least one embodiment the composition is added to liquor in a trihydrate classification circuit of said alumina trihydrate production process. The composition can be added to said liquor at one or more locations in a Bayer process where solid-liquid separation occurs.

In at least one embodiment the composition can be added to said liquor at one or more locations in a Bayer process where it inhibits the rate of nucleation of one or more alumina hydrate crystals in said process.

In at least one embodiment the composition can be added to said liquor at one or more locations in a Bayer process where it reduces the rate of scale formation in said process.

In at least one embodiment the composition can be added to said liquor at one or more locations in a Bayer process where it facilitates red mud clarification in the process.

In at least one embodiment the composition can be added in combination with or according to any of the compositions and methods disclosed in U.S. Pat. No. 8,252,266.

EXAMPLES

The foregoing may be better understood by reference to the following examples, which are presented for purposes of illustration and are not intended to limit the scope of the invention.

Example 1

50 gram of cellulose (dissolving wood pulp, bahia pulp, Solucell 350, disintegrated on a Retsch mill with a 1 mm screen) was charged to a 1500 ml cylindrical reaction flask equipped with an overhead stirrer in the form of a double helix. The cellulose was suspended in 800 gram of 2-methyl-2-butanol and the reaction flask was closed. The suspension was kept at ambient temperature and deoxygenated with a bottom nitrogen purge while the stirrer rotated at 250 rpm. The bottom nitrogen purge was kept for 30 minutes. At this point the bottom nitrogen purge was changed to top nitrogen blanket and 69.1 gram of a 25% sodium hydroxide solution was added to the suspended cellulose fiber slurry. The cellulose slurry was continuously stirred and the temperature was gradually increased from ambient to 80° C. over a period of 60 minutes. 69 g of glycidol (Aldrich) was added at a feed rate of 1 ml/minute to the stirred alkalized cellulose slurry. The temperature of the slurry was kept at 80° C. and controlled by heating or cooling. The mixture was kept at temperature for another 20 minutes. At this point 14 grain of a solution of sodium vinylsulfonate (Aldrich) was added to the warm (80° C.) and stirred mixture at a feed rate of 1 ml/minute. After completed addition the mixture was stirred at 80° C. for another 60 minutes. A product sample taken at this point was completely water-soluble. The slurried mixture of the alkalized cellulose ether was neutralized with acetic acid (approximately 29.5 g) against phenolphthalein (pink to clear). The crude 2,3-dihydroxypropyl-ethylsulfonated cellulose was isolated as a moist filter cake from the reaction slurry via filtration. The filter cake was dried in a tow step process. Most of the organic volatiles were removed in a once through air, drying oven at 60° C. over a period of 60 minutes. The reaming water in the crude cellulose ether was evaporated at 0.01 mmHg and a temperature not exceeding 25° C. over a period of 46 hours. 150 grams of a crude dry product were isolated containing 24% sodium acetate and 76% 2,3-dihydroxypropyl-ethylsulfonated cellulose. A 2% solution of the crude, dry cellulose ether had a viscosity of 36 cps (30 rpm, 22° C., spindle LS62).

Example 2

43 gram of cellulose (dissolving wood pulp, Toba Pulp Lestari, Tobacell EUC 94, disintegrated on a Retsch mill with a 1 mm screen) was charged to a 1500 ml cylindrical reaction flask equipped with an overhead stirrer in the form of a double helix. The cellulose was suspended in 800 grain of 2-methyl-2-propanol and the reaction flask was closed. The suspension was kept at ambient temperature and deoxygenated with a bottom nitrogen purge while the stirrer rotated at 250 rpm. The bottom nitrogen purge was kept for 30 minutes. At this point the bottom nitrogen purge was changed to top nitrogen blanket and 59.5 gram of a 25% sodium hydroxide solution was added to the suspended cellulose fiber slurry. The cellulose slurry was continuously stirred and the temperature was gradually increased from ambient to 80° C. over a period of 60 minutes, 59 g of glycidol (Aldrich) was added at a feed rate of 1 ml/minute to the stirred alkalized cellulose slurry. After completed addition the mixture was stirred at 80° C. for another 60 minutes. A product sample taken at this point was virtually free of suspended solids. The slurried mixture of the alkalized cellulose ether was neutralized with acetic acid (approximately 22.6 g) against phenolphthalein (pink to clear). The crude 2,3-dihydroxypropyl cellulose was isolated as a moist filter cake from the reaction slurry via filtration. The filter cake was dried in a tow step process. Most of the organic volatiles were removed in a once through air, drying oven at 60° C. over a period of 60 minutes. The reaming water in the crude cellulose ether was evaporated at 0.01 mmHg and a temperature not exceeding 25° C. over a period of 16 hours. 117.3 grams of a crude dry product were isolated containing 26% sodium acetate and 74% 2,3-dihydroxypropyl cellulose. A 2% solution of the crude, dry cellulose ether had a viscosity of 36 cps (30 rpm, 22° C., spindle LS62).

Example 3

8 g of a crude 2,3-dihydroxypropyl-ethylsulfonated cellulose prepared as in example 1 and with a viscosity of 35 cps (2%, 30 rpm, 23° C., spindle LS62) was dissolved in 92 g of water, 1.02 g (or as indicated in below table) of a 50% solution of NaOH was added to the mixture and the resulting solution was vigorously stirred with an overhead caged impeller at 2000 rpm until the mixture was homogeneous, approximately 2 minutes. 0.527 g (or as indicated in below table) of epichlorohydrin (Fluka) was added to the mixture and the resulting solution was again vigorously stirred with an overhead caged impeller at 2000 rpm until the mixture was homogeneous, approximately for 5 minutes. The mixture was allowed to rest over night for 16 hours to form a continuous cross-linked gel. The reaction crude was diluted to 2%, neutralized with acetic acid against phenolphthalein and inhibited against microbial degradation with a non-oxidizing biocide such as Kathon®. The so prepared solutions of the cross-linked 2,3-dihydroxypropyl-ethylsulfonated cellulose are suitable as coagulants and flocculants for aluminum trihydrate in the Bayer process.

TABLE 1

| mole EPI/ mole AGU | | 0 | 0.324 | 0.364 |
|---|---|---|---|---|
| mole NaOH/ mole EPI | | 0 | 2.24 | 2.73 |
| rpm | 3 | 26 | 2,360 | 4,800 |
| | 6 | 27 | 1,900 | 3,660 |
| | 12 | 31 | 1,590 | 2,840 |
| | 30 | 35 | 1,270 | 2,020 |
| | 60 | 37 | 1,070 | 1,576 |

EPI epichlorohydrin
AGU anhydrous glucose monomer unit of 2,3-dihydroxypropyl-ethylsulfonated cellulose
NaOH sodium hydroxide The cross-linking reaction of ethylsulfonated dihydroxypropyl cellulose was explored in detail either with ethylsulfonated dihydroxypropyl cellulose, dihydroxypropyl cellulose, or hydroxyethyl cellulose. Insights learned during the reactions between a cross-linking agent and either dihydroxypropyl cellulose or hydroxyethyl cellulose could be directly transferred to the cross-linking of ethylsulfonated dihydroxypropyl cellulose. A tabular summary of relevant reactions is shown below in tables 2 and 3.

TABLE 2

| Reaction # | Starting Cellulose Ether Brookfield Viscosity | Solvents | Activator | Cross-Linker | Conditions | Final Cross-Linked Cellulose Ether Brookfield Viscosity | Precedent |
|---|---|---|---|---|---|---|---|
| 5750-005 | Dihydroxypropyl Celluloses Ethylsulfonated 36 cps[5750-005] @ 2%, 30 rpm, LS62, ambient ° C. | Water | NaOH | Epichlorohydrin | 24 hours 23° C. | Cross-Linked Dihydroxypropyl Cellulose 1200 cps @ 2%, 30 rpm, LS63, ambient ° C. | |
| Mass % | 5.92% | 93.25% | 0.43% | 0.39% | | | |
| 5554-097 | Dihydroxypropyl Cellulose 25 cps[5554-092] @ 2%, 30 rpm, LS61, ambient ° C. | Water traces tert-butanol | NaOH | N.N-Methylene bisacrylamide | 4 hours 60° C. | Croos-Linked Dihydroxypropyl Cellulose 340 cps @ 2%, 30 rpm, LS62, ambient ° C. | |
| Mass % | 7.07% | 90.13% | 2.40% | 0.40% | | | |
| 5609-070 | Dihydroxypropyl Celluloses 133 cps[5609-071] @ 2%, 30 rpm, LS62, ambient ° C. | Water | NaOH | Divinyl-sulfone | 24 hours 23° C. | Croos-Linked Dihydroxypropyl Cellulose 2780 cps @ 2%, 30 rpm, LS62, ambient ° C. | |
| Mass % | 3.00% | 95.97% | 0.90% | 0.13% | | | |

TABLE 2

| Reaction # | Starting Cellulose Ether Brookfield Viscosity | Solvents | Activator | Cross-Linker | Conditions | Final Cross-Linked Cellulose Ether Brookfield Viscosity | Precedent |
|---|---|---|---|---|---|---|---|
| 5554-150 | Hydroxyethyl Celluloses 14 cps[5554-153] @ 2%, 30 rpm, LS61, ambient ° C. | Water | NaOH | N,N-Methylene bisacrylamide | 10 hours 60° C. | Cross-Linked Hydroxyethyl Cellulose 1170 cps @ 2%, 30 rpm, LS62, ambient ° C. | Journal of Applied Polymer Science (2002), 86(3), 667-671 |
| Mass % | 6.60% | 92.65% | 0.54% | 0.21% | | | |
| 5609-042 | Hydroxyethyl Cellulose 4 cps[5609-042] @ 2%, 30 rpm, LS61, ambient ° C. | Water | NaOH | Epichlorohydrin | 19 hours 23° C. | Cross-Linked Hydroxyethyl Cellulose 205 cps @ 2%, 30 rpm, LS62, ambient ° C. | EP 1,384,727 U.S. Pat. No. 4,389,319 |
| Mass % | 14.90% | 78.40% | 6.00% | 0.70% | | | |
| 5554-157 | Hydroxyethyl Cellulose 73 cps[5554-165] @ 8%, 30 rpm, LS61, ambient ° C. | Water traces tert-butanol | NaOH | Divinylsulfone | 1 hours 32° C. | Cross-Linked Hydroxyethyl Cellulose 1010 cps @ 2%, 30 rpm, LS63, ambient ° C. | A. L. Kjøniksen et al.; J. Phys. Chem. B 2005, 109, 12329-12336 |
| Mass % | 5.50% | 92.00% | 2.20% | 0.30% | | | |
| 5554-186 | Hydroxyethyl Celluloses 18 cps[5554-187] @ 2%, 30 rpm, LS61, ambient ° C. | Water | NaOH | Glycerol diglycidyl-ether technical | 1 hours 60° C. | Cross-Linked Hydroxyethyl Cellulose 57 cps @ 2%, 30 rpm, LS61, ambient ° C. | U.S. Pat. No. 4,549,907 |
| Mass % | 7.97% | 89.78% | 1.85% | 0.40% | | | |
| 5554-190 | Hydroxyethyl Celluloses 18 cps[5554-191] @ 2%, 30 rpm, LS61, ambient ° C. | Water | NaOH | Resorcinol diglycidyl-ether | 0.7 hours 75° C. | Cross-Linked Hydroxyethyl Cellulose 1110 cps @ 2%, 30 rpm, LS63, ambient ° C. | |
| Mass % | 7.97% | 89.48% | 1.85% | 0.70% | | | |
| 5554-192 | Hydroxyethyl Celluloses 18 cps[5554-193] @ 2%, 30 rpm, LS61, ambient ° C. | Water | NaOH | Resorcinol diglycidyl-ether | 0.5 hours 75° C. | Cross-Linked Hydroxyethyl Cellulose 50 cps @ 2%, 30 rpm, LS61, ambient ° C. | |
| Mass % | 8.00% | 89.75% | 1.85% | 0.40% | | | |
| 5609-001 | Hydroxyethyl Celluloses 18 cps[5554-193] @ 2%, 30 rpm, LS61, ambient ° C. | Water | NaOH | 1,4 Benzoquinone | 44 hours 23° C. | Cross-Linked Hydroxyethyl Cellulose 1812 cps @ 2%, 30 rpm, LS62, ambient ° C. | U.S. Pat. No. 4,183,765 U.S. Pat. No. 4,469,620 |
| Mass % | 8.01% | 90.99% | 0.30% | 0.70% | | | |

The results of the examples are as follows:

1. The dihydroxypropyl cellulose ether has as DS (degree of substitution, number of dihydroxypropyl groups per monomeric glucose unit in the cellulose chain) in the range of 0.5 to 3.0.
2. The preferred DS of the dihydroxypropyl cellulose ether is in the range of 1.5 to 2.5.
3. The dihydroxypropyl cellulose ether can have in addition to the DS in the range of 1.5 to 2.5 a MS (multiple degree of substitution, average number of dihydroxypropyl groups per single hydroxide appendage on the monomeric glucose unit in the cellulose chain) of greater or equal to 1.
4. The dihydroxypropyl cellulose ether has anionic substituents.
5. The dihydroxypropyl cellulose ether has anionic substituents were the DS of the anionic component is greater then 0 and less then 0.5.
6. The preferred anionic substituent on the dihydroxypropyl cellulose ether is a ethylsulfonate group.
7. The dihydroxypropyl ethylsulfonated cellulose has been cross-linked under homogeneous or heterogeneous conditions.
8. The cross-linkage between the individual dihydroxypropyl ethylsulfonated cellulose ether is of covalent nature.
9. The cross-linking of the dihydroxypropyl ethylsulfonated cellulose ether had the effect of increasing its molecular weight and its solution viscosity.
10. The dihydroxypropyl ethylsulfonated cellulose had before cross-linking a Brookfield viscosity in the range of 10 to 100 cps at 30 rpm, 20° C., and 2% actives content and after cross-linking a Brookfield viscosity in the range of 200 to 3000 cps at 30 rpm, 20° C., and 2%.
11. The cross-linked dihydroxypropyl ethylsulfonated cellulose is capable of enhancing the flocculation of aluminum trihydrate solids from pregnant process liquors in the Bayer process.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of producing alumina utilizing a Bayer process, the method comprises the step of adding to a liquor or slurry of the Bayer process, a composition containing one or more ethylsulfonated cross-linked polysaccharides.

2. The method of claim 1 wherein the cross-linked polysaccharides, comprises a reaction product made by cross-linking dextran or dihydroxypropyl cellulose or polysaccharides with a cross linking agent to form a cross-linked molecule.

3. The method of claim 1 wherein the cross-linked polysaccharide is dihydroxypropyl cellulose and the number of dihydroxypropyl groups per monomeric glucose unit in the cellulose chain is in the range of 0.5 to 3.0.

4. The method of claim 1 wherein the cross-linked polysaccharide has been reacted with a sufficient amount of sodium vinylsulfonate or sodiumchloroacetate to impart to the polysaccharide one or more anionic substituent regions.

5. The method of claim 3 wherein the dihydroxypropyl cellulose is the reaction product of reacting cellulose with 3-chloro-1,2-propanediol.

6. The method of claim 3 wherein the dihydroxypropyl ethylsulfonated cellulose before cross-linking had a Brookfield viscosity in the range of 10 to 100 cps at 30 rpm, 20° C., and 2% actives content and after cross-linking a Brookfield viscosity in the range of 200 to 3000 cps at 30 rpm, 20° C., and 2% actives content.

7. The method of claim 1 wherein the composition is added to said liquor at one or more locations and thereby inhibits the rate of nucleation of one or more alumina trihydrate crystals in said process.

8. The method of claim 1 wherein the composition is added to said liquor at one or more locations and thereby reduces the rate of scale formation in said process.

9. The method of claim 1 wherein the composition is added to said liquor at one or more locations to facilitate red mud clarification in said process.

10. The method of claim 1 wherein the composition addition improves the yield of alumina trihydrate sequestration from an alumina trihydrate process by adding the composition to said liquor of said process.

11. The method of claim 10 wherein the crosslinking agent is selected from the group consisting of epichlorohydrin, dichloroglycerols, divinyl sulfone, bisepoxide, phosphorus oxychloride, trimetaphosphates, dicarboxylic acid anhydride, N,N'-methylenebisacrylamide; 2,4,6-trichloro-s-triazine, and any combination thereof.

12. The method of claim 1 wherein the ethylsulfonated cross-linked polysaccharides, is a reaction product made by cross-linking one of: scleroglucan, dextran, dihydroxypropyl cellulose, and any combination thereof with a cross linking agent to form the ethylsulfonated cross-linked polysaccharides.

* * * * *